United States Patent [19]

Hirakawa et al.

[11] Patent Number: 4,471,990
[45] Date of Patent: Sep. 18, 1984

[54] RAILROAD CAR WHEEL

[75] Inventors: Kenji Hirakawa, Osaka; Haruo Sakamoto; Shigeru Suzuki, both of Hyogo; Shigeo Sugawara, Nara, all of Japan

[73] Assignee: Sumitomo Metal Industries, Ltd., Osaka, Japan

[21] Appl. No.: 454,556

[22] Filed: Dec. 30, 1982

Related U.S. Application Data

[63] Continuation of Ser. No. 178,638, Aug. 15, 1980, abandoned.

[30] Foreign Application Priority Data

Aug. 31, 1979 [JP] Japan ................. 54-112111

[51] Int. Cl.³ .................. B60B 3/02; B60B 17/00; B60B 21/04
[52] U.S. Cl. ............................ 295/21; 295/1; 295/22; 295/27
[58] Field of Search ................. 295/1, 7, 15, 21, 22, 295/24, 25, 27

[56] References Cited

U.S. PATENT DOCUMENTS

| 785,759 | 3/1905 | O'Neil et al. ............. 295/15 |
| 3,038,755 | 1/1962 | Keysor ................... 295/21 |
| 3,127,212 | 3/1964 | Eklund ................... 295/21 |
| 3,311,403 | 3/1967 | Beetle et al. ............. 295/27 |
| 4,145,079 | 3/1979 | Greenfield et al. ......... 295/21 |

FOREIGN PATENT DOCUMENTS

| 445124 | 4/1936 | United Kingdom ............ 295/7 |
| 750713 | 6/1956 | United Kingdom ............ 295/1 |

OTHER PUBLICATIONS

Association of American Railroads; Steel Wheel Design BX-33 and B-40; pp. G-91-Aug. 1, 1946; G-68A-1956.

Primary Examiner—Howard Beltran
Attorney, Agent, or Firm—Wenderoth, Lind & Ponack

[57] ABSTRACT

A railroad car wheel is designed to have an amount of displacement of 40 mm or larger, this amount being the amount of displacement of a rim portion relative to a boss portion of the wheel which is the distance between two lines perpendicular to the axis of the wheel, one from the midpoint of the thickness of a plate portion adjacent to ends of curves of the rim fillets and the other from the midpoint of thickness of the plate portion adjacent to ends of curves of the boss fillets.

2 Claims, 11 Drawing Figures

RAILROAD CAR WHEEL

This is a continuation of application Ser. No. 178,638, filed Aug. 15, 1980, now abandoned.

BACKGROUND OF THE INVENTION

The present invention relates to a railroad car wheel and, more particularly, to a railroad car wheel of a shape in which a plate portion having a slight inclination toward the outside of the track is formed in a straight line from a boss portion to a rim portion and the rim portion is displaced toward the outside of the track from the boss portion.

Conventional railroad car wheels for export, particularly those for export to the United States are of the type commonly referred to as an A-type wheel in Japan, having a conically shaped plate portion between a boss portion and a rim portion which is displaced outwardly from the boss portion with respect to the center of the track, in which the amount of displacement of said conical plate portion is 30 mm or less, which value is not especially large. In the railroad car wheels of this shape, when some extraordinary brake such as brake force locking is applied and the temperature of the rim tread surface rises to 500° C. or above, a circumferential residual tensile stress is caused in the rim portion after cooling. Experiments show that the more severe the braking conditions, the larger the value of the residual tensile stress.

While fracture of the wheel is sufficiently accounted for by fracture mechanics, in the case where a flaw such as a thermal crack is present in the interior of the rim portion fracture of an wheel may be caused if the extraordinary brake force as described above is applied thereto.

According to fracture mechanics, the condition for fracture is:

$$K_{IC} \leq K_I = \eta \sigma_t \sqrt{\pi a}$$

where,
$K_{IC}$: fracture toughness (kgf/mm$^{3/2}$)
$K_I$: stress intensity factor (kgf/mm$^{3/2}$)
$\eta$: stress intensity magnification factor
$\sigma_t$: residual circumferential stress (kgf/mm$^{3/2}$)
a: depth of thermal crack (mm)

Accordingly, fracture of the wheel is probably caused depending upon the magnitude of the values $K_{IC}$, $\sigma_t$ and a. By experimentally obtaining distribution of stress in the material, the approximate value of the stress intensity factor $K_I$ can be calculated with respect to the depth of thermal crack a. In the conventional wheel material, for instance AAR Standard Class B (Carbon content 0.57–0.67 wt %), the fracture toughness $K_{IC}$ is 150–200 kgf/mm$^{3/2}$, which shows, for example, in the case where a drag brake force is applied for one hour, where braking force $\mu P$ is 300 kgf and speed is 88 km/h, from the result of calculation that wheel fracture probably occurs at a depth of the thermal crack a of 11–26 mm.

In the material of railroad car wheels currently in use, occurrence and growth of a thermal crack, which depends partly upon braking conditions, cannot be avoided in severe conditions. Accordingly, whether or not a wheel fracture will occur depends largely upon the residual stress caused by extraordinary braking.

For preventing such a wheel fracture, while it is effective to increase the fracture toughness of the material, the most effective step for this purpose is to improve the shape of the wheel so that no substantial residual stress is caused by heat due to extraordinary braking force to thereby leave the wheel nearly in compressive residual stress at the time of its manufacture. Even when some residual tensile stress is caused, if its value is small and the stress intensity factor for the conceivable depth of the thermal crack is fairly small compared with the value of the fracture toughness, there will be no problem of fracture of the wheel.

SUMMARY OF THE INVENTION

An object of the present invention is to provide a railroad car wheel having high resistance to fracture or having small residual stress in the interior of its rim caused when an extraordinary brake force is applied.

In the present invention, accordingly, the shape of the wheel is improved so as to make as small as possible the residual tensile stress caused in the interior of the rim by the extraordinary braking force. For specifically determining the shape of the wheel, the following condition is set up:

i. The amount of displacement is 40 mm or larger, assuming that the amount of displacement of the rim portion relative to the boss portion of the wheel is the distance between two lines perpendicular to the axis of the wheel, one from the midpoint of thickness of the plate portion adjacent to ends of the curves of the rim fillets and the other from the midpoint of thickness of the plate portion adjacent to ends of the curves of the boss fillets.

Further, in the present invention, the following conditions may be added where required.

ii. The plate portion is connected to the rim portion substantially at the middle of the width of the rim portion.

iii. The plate portion is connected to the boss portion at a point displaced somewhat inwardly of the center of the width of the boss portion with respect to the track.

iv. The connecting portions of the plate portion described in ii. and iii. above are perpendicular to the axis of the wheel and preferably as long as possible.

v. The rim fillets are formed so that each has an angle of inclination at the end thereof of approximately 20 degrees with respect to the horizontal direction.

vi. The wheel is formed by rolling.

BRIEF DESCRIPTION OF THE DRAWINGS

The invention will be better understood from the following description taken in connection with the accompanying drawings in which.

DESCRIPTION OF THE PREFERRED EMBODIMENTS

Figure 1:
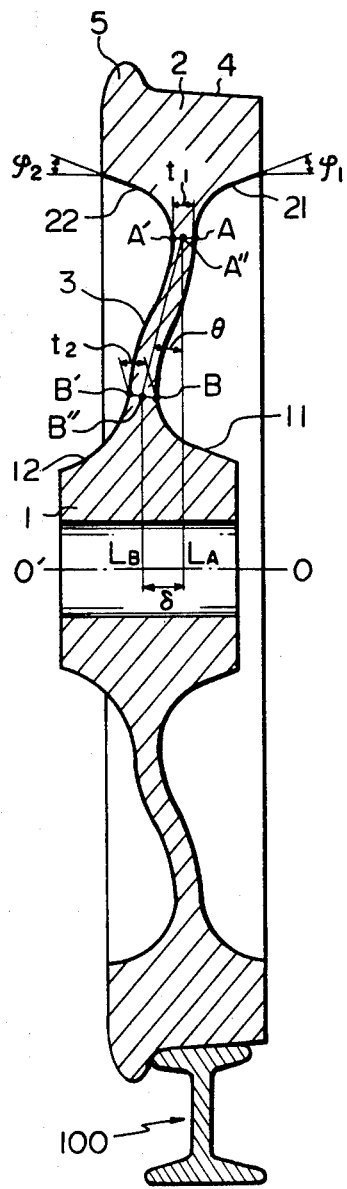
FIG. 1 is a longitudinal sectional view of the wheel according to the present invention showing the dimensions of the essential portions thereof.

The schematic representation of the shape of the wheel according to the present invention and the dimensions of the essential portions thereof will now be described with reference to FIG. 1.

In the wheel according to the present invention, a boss or hub portion 1 and a rim portion 2 are connected integrally by a conically-shaped plate portion 3. The rim portion 2 is displaced outwardly of the boss 1 with respect to a track 100. The rim portion 2 is provided on the outer periphery thereof with a rim tread surface 4 and a flange 5.

Designated by A is the end point of a curve of fillet 21 of the rim portion on the side opposite to the flange. Designated by A' is a point at the end portion of a curve of fillet 22 of the rim portion on the flange side, with the line segment AA' being at the minimum thickness $t_1$ of the plate portion 3 at the outer periphery toward the rim. The midpoint of the line segment $\overline{AA'}$ is designated A''.

Likewise, designated by B is the end point of a curve of fillet 11 on the boss portion 1 on the side opposite to the flange, and designated by B' is a point at the end portion of a curve of fillet 12 of the boss portion on the flange side, with the line segment $\overline{BB'}$ the minimum thickness $t_2$ of the plate portion 3 at the inner periphery toward the boss. The midpoint of the line segment $\overline{BB'}$ is designated B''.

Designated by $L_A$ and $L_B$ are lines perpendicular to axis OO' of the wheel and through the midpoints A'' and B'', respectively. The distance between the perpendicular lines $L_A$ and $L_B$ is designated as the amount of displacement $\delta$. The angle at which the line segment $\overline{A''B''}$ intersects the perpendicular lines $L_A$ or $L_B$ is designated as the angle of displacement $\theta$.

The angles of inclination of the fillets 21 and 22 of the rim portion 2 at the ends thereof are designated by $\phi_1$ and $\phi_2$, respectively.

Figure 2:
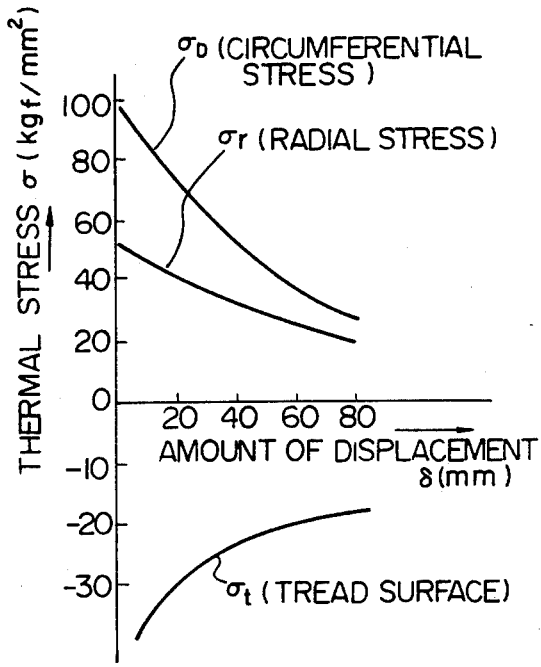
FIG. 2 is a graph showing the results of calculations of the relation between the amount of displacement and the thermal stress of the wheel.

In order to increase the resistance to wheel fracture, it is necessary to minimize the residual stress caused by extraordinary braking heat. The inventors have calculated the effects of the shape of the wheel represented by various factors thereof on the residual stress of the wheel and found that the factors that give the most noticeable effects are the amount of displacement $\delta$, the angle of displacement $\theta$, and the plate thicknesses $t_1$ and $t_2$. While the thermal stress can be reduced by increasing the plate thicknesses $t_1$ and $t_2$, the increase in the plate thicknesses is not desirable since the stress in the plate portion increases proportionally to the square of the plate thickness. The results of the calculation are shown in FIG. 2. While only the variation of the thermal stress $\sigma$ with respect to the variation of the amount of displacement $\delta$ is shown in FIG. 2, it will be obvious that a similar tendency will be observed between the angle of displacement $\theta$ and the thermal stress $\sigma$ since, if the diameter of the wheel remains unchanged, the larger the amount of displacement $\delta$, the larger the angle of displacement $\theta$.

While FIG. 2 shows the variation of the thermal stress $\sigma$ with respect to the amount of displacement $\delta$, it will be obvious that the residual stress with respect to the thermal stress qualitatively shows the same tendency. Accordingly, the greater the amount of displacement, the smaller the residual stress. Among conventional wheels, while varying depending upon the type, A-type wheels generally have an amount of displacement $\delta=30$ mm and an angle of displacement $\theta=15°$ or less. It is possible, therefore, to reduce the residual stress by increasing these values.

On the other hand, however, an increase in the amount of displacement $\delta$ and the angle of displacement $\theta$ inevitably causes a decrease in the curvatures of the fillet 22 of the rim portion 2 on the flange side and the fillet 12 of the boss portion 1 on the side opposite to the flange, respectively, resulting in greater stress in these portions when a mechanical force (e.g. vertical wheel pressure or lateral wheel pressure) is exerted thereon, leading to concern for the effect of fatigue strength.

Figure 3A:
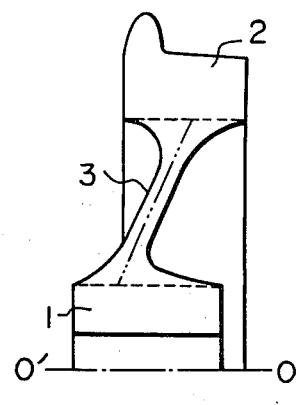
FIGS. 3A and 3B are longitudinal sectional views of a half portion of a wheel for specifically determining the shape of the wheel according to the present invention.
Figure 3B:
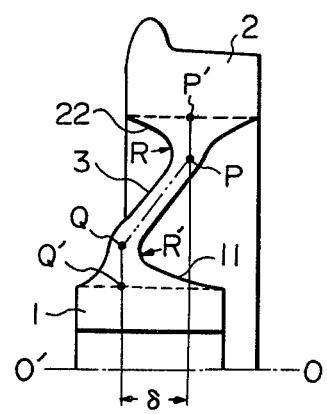
Figure 4:
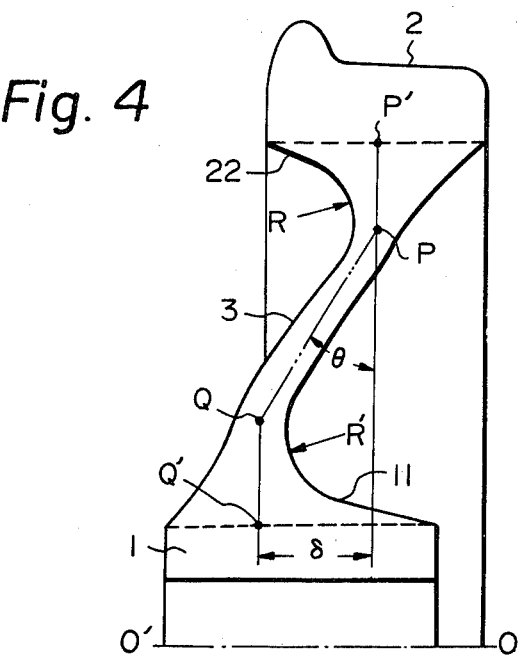
FIG. 4 is a longitudinal sectional view of a half portion of the wheel of the most preferred embodiment according to the present invention.

Therefore, the plate portion 3 preferably of the shape shown in FIG. 3B rather than the shape shown in FIG. 3A. That is, the wheel is so designed that imaginary points P and Q corresponding to said midpoints A'' and B'', a point P' substantially at the middle of the width of the rim 2 and a point Q' within the width of the boss 1 on the outside diameter determined when the amount of displacement $\delta$ is determined, are provided in order that extension lines of line segments $\overline{PP'}$ and $\overline{QQ'}$ are at right angles to the central axis of the wheel OO' and that the line segments $\overline{PP'}$ and $\overline{QQ'}$ are as long as possible. In FIGS. 3 and 4, the borders of the boss portion 1 and the rim portion 2 are represented by dashed lines.

By designing the wheel as described above, curvature R of the curve of the fillet 22 of the rim 2 on the flange side and curvature R' of the curve of the fillet 11 of the boss portion 1 on the flange side can be given values of the same order as in a conventional wheel having a small amount of displacement $\delta$ and, further, the fatigue safety factors at the ends of the curves of the curvatures R and R' are also on the same order as in the conventional wheel as can be confirmed by calculation.

During rolling of the railroad car wheel, by locating the point P' approximately at the middle of the axial width of the rim portion 2 and making the angles $\phi_1$ and $\phi_2$ (see FIG. 1) of of the ends of the rim fillets 21 and 22, respectively, approximately 20°, from the viewpoint of manufacturing technology, the rolling can be performed without any difficult problems.

FIG. 4 shows an embodiment of the wheel according to the present invention, designed as described above. This wheel has a shape in which the rim portion 2 is displaced outwardly of the track with respect to the boss portion 1 and said rim and boss portions are connected with each other by the conically shaped plate portion 3. The line segment $\overline{PP'}$ from the axial width midpoint P' of the rim portion 2 to the plate thickness midpoint P adjacent to the end of the curve of the fillet 22 of the rim portion 2 on the flange side is made substantially perpendicular to the central axis OO' of the wheel, from which the plate portion 3 is formed, and the line segment $\overline{QQ'}$ from the plate thickness midpoint Q adjacent to the end of the curve of the fillet 11 of the boss portion 1 on the side opposite to the flange to the point Q' specified on the outside diameter of the width of the boss portion 1 is made substantially perpendicular to the central axis OO' of the wheel, from which the plate portion 3 is formed. By so designing the wheel, the curvature R of the fillet 22 of the rim portion 2 and the curvature R' of the fillet 11 of the boss portion 1 can be enlarged.

In this embodiment, the amount of displacement $\delta$ is 40 mm or greater. This is because where the amount of displacement is less than 40 mm no noticeable reduction can be expected in the residual stress caused upon application of extraordinary brake force. A wheel with hub-cut naturally requires special consideration.

With respect to the wheel according to the present invention having the above described shape and a conventional wheel, calculations were performed for the same conditions, the results of which are shown in FIGS. 5A, 5B and 6A, 6B.

The conventional wheel used in the calculations was a J-36 wheel (AAR Standard). The condition for the calculations was that a brake force of $\mu P = 300$ kgf was applied for an hour at a speed of 88 km/h.

Figure 5A:
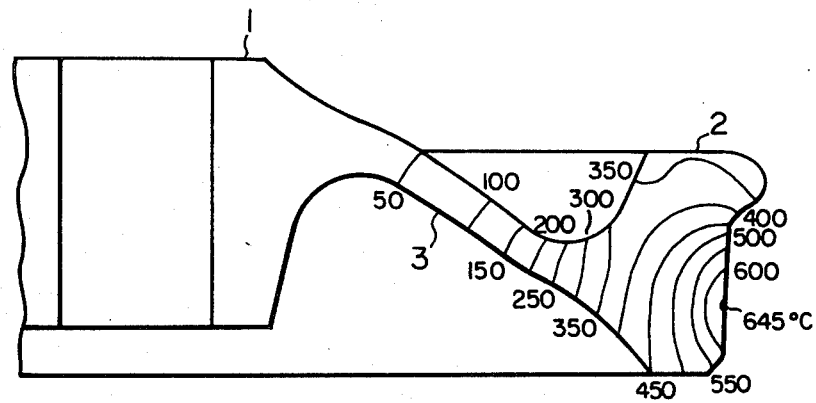
FIGS. 5A and 5B are views showing distribution of the temperature rise caused by application of a stop brake force to the wheel according to the present invention and a prior art wheel, respectively.
Figure 5B:
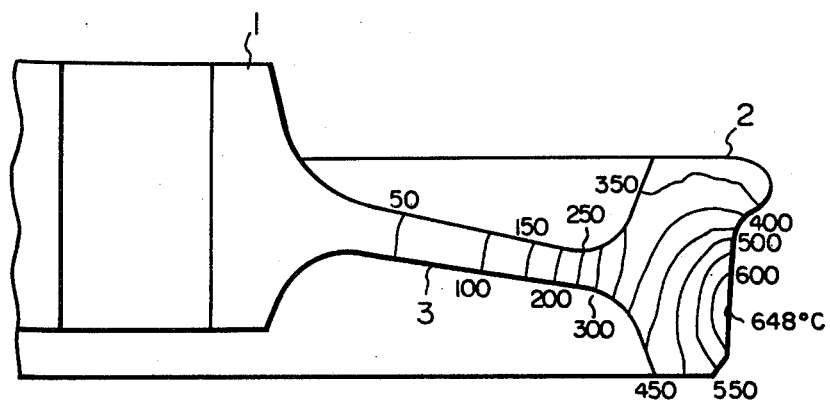
Figure 6A:
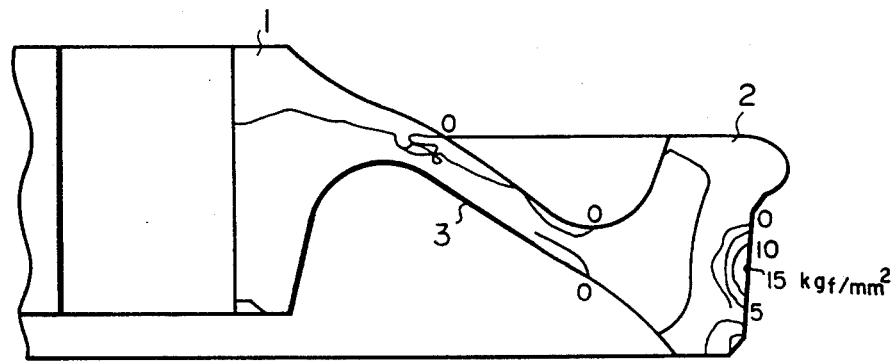
FIGS. 6A and 6B are views showing distribution of the residual stress caused by application of a stop brake force to the wheel according to the present invention and a prior art wheel, respectively.
Figure 6B:
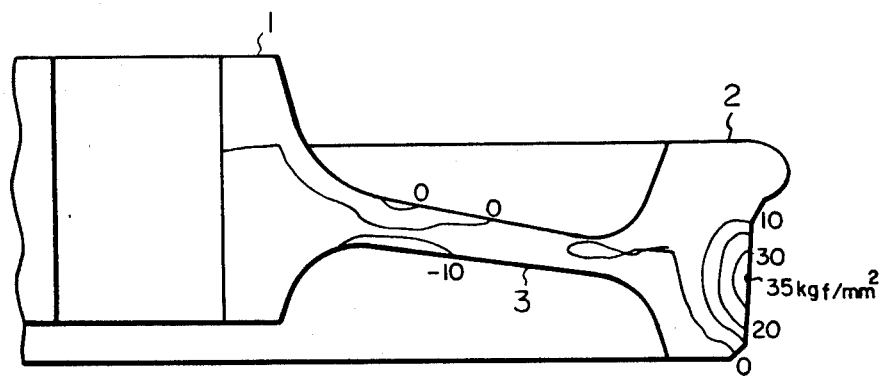

The results of the calculation under this condition show the rise in temperature of the wheel as shown in FIGS. 5A and 5B, and the residual stress as shown in FIGS. 6A and 6B. In these drawings, FIGS. 5A and 6A show the results for the wheel according to the present invention and FIGS. 5B and 6B show the results for the conventional wheel.

As is obvious from these drawings, with respect to the rise of temperature there is no substantial difference between the conventional wheel (highest temperature 648° C.) and the wheel according to the present invention (highest temperature 645° C.). With respect to the residual stress, however, there is a 57% reduction from the maximum value 35 kgf/mm$^2$ in the conventional wheel to the maximum value 15 kgf/mm$^2$ in the wheel according to the present invention.

Figure 7:
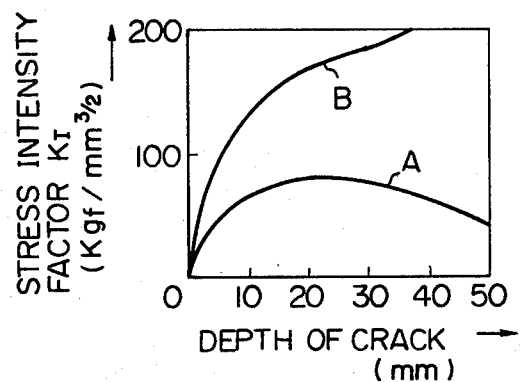
FIG. 7 is a graph showing the results of calculations for determining the relationship between the depth of crack caused in the wheel by application of a stop brake thereto and the stress intensity factor.

From these results, the stress intensity factor $K_I$ was calculated with respect to the wheel according to the present invention and the conventional wheel, and shown in FIG. 7 by curves A and B, respectively. As seen from FIG. 7, the characteristic curve A of the wheel according to the present invention is smaller in value than the characteristic curve B of the conventional wheel. In the wheel of the shape according to the present invention, therefore, even where the tread surface of the wheel is heated to a temperature on the order of 700° C. by extraordinary braking force, the residual stress can be reduced and, further, in view of the fact that the fracture toughness of the wheel material is 100 kgf/mm$^{3/2}$ or greater, it is evident that there will be no wheel fracture even where the depth of the thermal crack reaches the thickness of the rim portion under such conditions.

Figure 8:
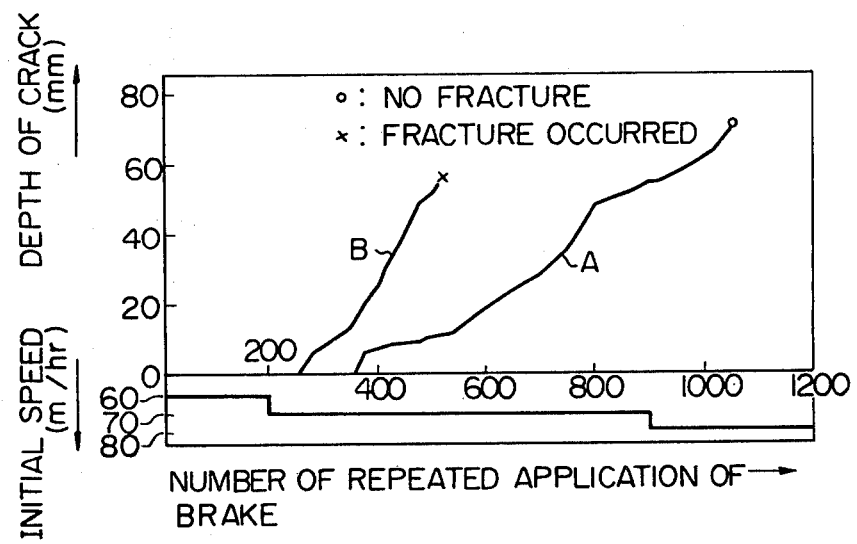
FIG. 8 is a graph showing the results of actual braking tests.

FIG. 8 shows the results of braking tests using actual wheels for causing thermal cracks leading to fracture of the wheels. In FIG. 8, curve A shows the characteristics of the wheel according to the present invention, and curve B shows the characteristics of the conventional wheel. As shown in FIG. 8, the conventional wheel fractured when the thermal crack length in the tread surface grew to 57 mm, but the wheel according to the present invention did not fracture even when the thermal crack length reached the full width of the tread surface.

In the braking tests, the thermal cracks were caused and grown by repeated application of the stop brake. The stop brake has greater calorific value than the drag brake and, accordingly, provides much more severe conditions for causing and growing thermal cracks. It may well be said that these braking tests are in conformity to the realities of practice since the stop brake is used in actual practice.

The thermal stress and the residual stress are reduced by increasing the amount of displacement $\delta$ for the following reason. That is, when the amount of displacement $\delta$ is increased, the rigidity of the plate portion is reduced resulting in that when the rim portion is heated and expanded radially outwardly, the internal stress of the rim portion is effected by the degree of rigidity of the plate portion. The rigidity of the plate portion can be reduced by increasing the amount of displacement $\delta$ or by reducing the thickness of the plate portion. However, reduction in the thickness of the plate portion causes reduction in the fatigue strength of the plate portion.

While we have shown and described specific embodiments of our invention, it will be understood that these embodiments are merely for the purpose of illustration and description and that various other forms may be devised within the scope of our invention, as defined in the appended claims.

What is claimed is:

1. A conventional size railroad car wheel having a diameter of 28–40 inches and a hub with a rotational axis and ends at the opposite ends of the rotational axis, a rim portion coaxial with said hub axis and having end edges at the opposite ends as viewed along the hub axis and a plate portion connecting said rim portion and said hub, said rim portion being dispaced outwardly of said hub with respect to a track on which said wheel rolls, the rim portion having a rim connecting portion projecting radially inwardly of the wheel from said rim portion with rim fillets on both faces extending from the radially inner end of said rim connecting portion to the end edges of said rim portion, a hub connecting portion projecting radially outwardly from said hub with hub fillets on both faces extending from the radially outer end of said hub connecting portion to the axial ends of said hub, and a conically shaped plate extending between said radially inner end of said rim connecting portion and said radially outer end of said hub connecting portion, the midpoint of thickness of the plate at the radially inner end of said rim connecting portion being on a radial line from the axial midpoint of the axial dimension of said rim portion and perpendicular to the axis of the wheel, and the midpoint of the thickness of said plate at the radially outer end of said hub connecting portion being on a radial line which intersects said axis of the hub perpendicular thereto and is inwardly of the track from the center of the axial dimension of the hub in the direction of the track width, the amount of displacement of said rim portion relative to said hub being in the range of 40–80 mm as measured parallel to the rotational axis of said hub and between two radial lines perpendicular to the rotational axis of the hub for reducing the rigidity of said plate portion, one line extending from the midpoint of the thickness of the radially inner end of the rim connecting portion and the other line extending from the midpoint of the thickness of the radially outer end of said hub connecting portion, the radial dimensions of said rim connecting portion and said hub connecting portion relative to said hub being as large as possible for providing a fatigue strength substantially the same as in conventional railroad car wheels, whereby the wheel fracture due to thermal cracking of the wheel tread due to severe braking conditions can be prevented.

2. A railroad car wheel as claimed in claim 1 in which the surfaces of the rim fillets where they join the opposite edges of the rim portion are at an angle of 20° to the inner radial surface of the rim portion.

* * * * *